United States Patent

Takagi et al.

[11] 3,986,736
[45] Oct. 19, 1976

[54] PIPE JOINT

[76] Inventors: Tatsuya Takagi, 6-10; Teruya Takagi, 6-4, both of Araebisu, Nishinomiya, Japan

[22] Filed: Jan. 31, 1975

[21] Appl. No.: 546,032

[30] Foreign Application Priority Data
  Feb. 1, 1974  Japan.............................. 49-12768

[52] U.S. Cl............................... 285/341; 285/382.7
[51] Int. Cl.² .......................................... F16L 17/02
[58] Field of Search ........... 285/341, 342, 343, 356, 285/332.3, 382.7, DIG. 19, 231, 345, 347, 424

[56] References Cited
UNITED STATES PATENTS

| 2,691,536 | 10/1954 | Tomminga.................... 285/332.3 X |
| 3,708,186 | 1/1973 | Takagi et al........................ 285/341 |
| 3,809,413 | 5/1974 | Boisserond...................... 285/356 X |

FOREIGN PATENTS OR APPLICATIONS

| 587,084 | 1/1925 | France................................ 285/341 |

*Primary Examiner*—Dave W. Arola
*Attorney, Agent, or Firm*—Stewart and Kolasch, Ltd.

[57] ABSTRACT

A pipe joint assembly comprising, in combination, a pipe to be coupled having at a predetermined outer position spaced from its end a rolled circular groove of a preselected depth, said groove having a semicircular cross-section, a sleeve and a fastener mounted on said pipe, a seamless circular packing disposed in said groove, said packing having a circular cross-section, said sleeve having a rear end face of a given circular width which is adapted to make face-to-face contact with said packing, a body having a tapered inner surface, the diameter of which decreases in the rearward direction, said body receiving the end portion of the pipe, the forward or entrance diameter of said tapered inner surface being slightly larger than the outer diameter of said sleeve, said body and said fastener provided with means for connecting with each other, whereby, when said fastener is fastened on said body, said sleeve is reduced by the tapered inner surface of said body to securely contact said pipe and the rear end face of the sleeve simultaneously presses against said packing toward the interior part of the tapered inner surface so that said packing is deformed to a certain extent irrespective of the outer diameter tolerance of the pipe to make a tight contact with said groove, to make a tight contact with the tapered inner surface and to make a tight contact with the sleeve rear end face, respectively.

6 Claims, 5 Drawing Figures

PIPE JOINT

BACKGROUND OF THE INVENTION

The present invention relates to a threadless pipe joint being coupled with a small metal pipe and capable of being used under high pressure as well as low pressure. The pipe joint of the present invention is particularly suitable for double-roll brazed steel pipes which are used as an automobile brake oil pipe.

The double-roll brazed steel pipe, as shown in FIG. 1a, is made from a steel strap previously copper-plated on its opposite surface by a process that is doubled-rolled in the tubular form and then passed through energized high-frequency electromagnetic coils where it is rapidly heated with the result that the face-to-face copper platings melt and join together. The seamline is then brazed.

In comparison with seamless steel pipes made by cold-drawing, the above-mentioned pipe is inexpensive and has a clean inner surface. Furthermore, it is possible to make thin-walled pipes that cannot be made by drawing. The pipe is also more reliable than butt-welded steel pipes. As compared with copper pipes, it, of course, is very inexpensive and is high pressure-proof. In spite of such advantages, the above-mentioned pipe cannot be joined by the conventional pipe joint due to its elongated seamlines on both the inner and outer surfaces thereof. The seamlines, which are the opposite sidelines of the original strap, are shown in FIG. 1b with reference to numerals 16 and 17. The pipe is primarily used as automobile brake oil pipes which are coupled with the joint in automobile factories, where its end portion is flared into a trumpet form and then dipped in a soldering bath to cover the seamline prior to coupling with the joint. This procedure requires too many man hours to be performed at any place other than the factory, so that pipes of this type are rarely used except for automobile piping parts.

It is the primary object of the present invention to provide a pipe joint assembly available for joining together double-roll brazed steel pipes as well as small diameter metal pipes such as copper pipes and aluminum pipes.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become apparent from the following description taken in connection with the accompanying drawings, wherein

FIG. 1b is a side view of the pipe of FIG. 1a;

SUMMARY OF THE INVENTION

The pipe joint assembly of the present invention comprises, in combination, a pipe having at a given position on its outer surface a circular cold-rolled groove, a fastener and a sleeve in turn mounted on the pipe, a seamless circular packing fitted in the groove and a body adapted to combine with the fastener. The groove has a semi-circular section, or the like, and the packing has a circular section. The rear end face of the sleeve is provided with a given width so as to make a face-to-face contact with the packing. The body has an inner conical surface, the entrance diameter of which is slightly larger than the outer diameter of the sleeve in order to enable it to receive the pipe end portion and reduce the rear end portion of the sleeve so as to closely contact the pipe when the fastener is tightly combined with the body. The rear end face of the sleeve is arranged to press the packing inwardly to the body when the fastener is fastened, so that the packing is deformed to make a tight contact with the groove, with the inner conical surface of the body and with the rear end face of the sleeve with the result that the desired sealing effect is accomplished.

DESCRIPTION OF THE PREFERRED EMBODIMENTS

Figure 1A:
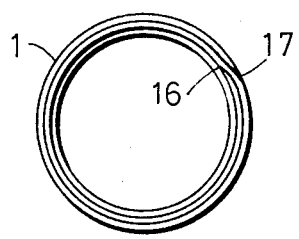
FIG. 1a is an end view of a double-roll brazed pipe coupled with the pipe joint according to the present invention.
Figure 1B:
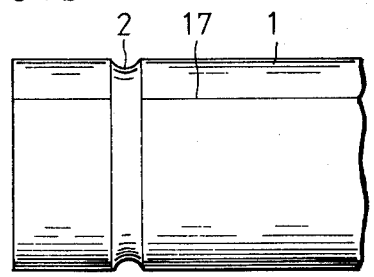

A pipe 1, to be assembled with the pipe joint assembly of the present invention, has on its outer surface a circular groove 2 of a given depth, cold-rolled by a hand tool such as a three roll type pipe cutter as follows: The tool is fitted at a predetermined position spaced from the end of the pipe. The grooving roll is pressed against the outer surface of the pipe 1 and rotated to cold-roll a circular groove 2 having a semi-circular cross-section, or the like, as seen in FIG. 1b.

The circular groove can be even formed on thin-walled pipes having an 8mm outer diameter and a 0.6mm thickness such as, for example, brake oil pipes, without inserting a mandrel into the inside of the pipe. The inner surface of the thus formed groove 2 is mirror-like due to the cold-rolling, and is also free of seamlines in the case of double-roll pipes.

Figure 2:
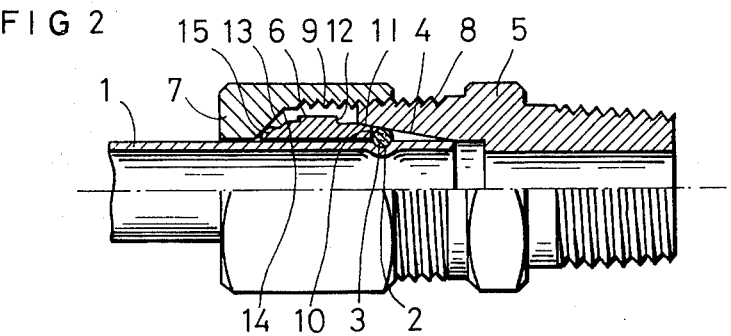
FIGS. 2 and 3 are side views, partially in longitudinal section, of the inventive pipe joint assembly of the present invention and the pipe coupled therewith, illustrating in FIG. 2 the fastener in a loose state and in FIG. 3 the fastener, tightly fastened.
Figure 3:
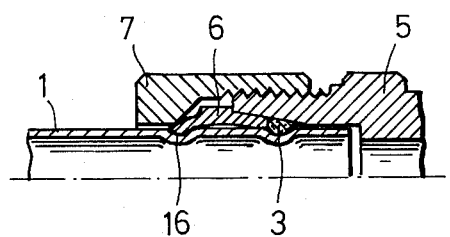
Figure 4:
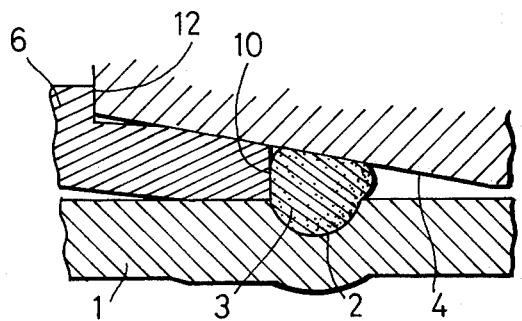
FIG. 4 is an enlarged partial section of FIG. 3 illustrating the sealing effect achieved utilizing the pipe joint assembly of the present invention.

Referring to FIGS. 2-4, on the pipe 1 are successively mounted a fastener 7 containing an inner female thread 9, like a hollow nut, a mild steel sleeve 6 containing a rear end face 10 having a given width, a seamless circular packing 3 having a round cross-section, and a body 5 having a tapered inner surface 4 and a threaded outer surface 8. The packing 3 is fitted in the groove 2. Since the fastener 7 and the body 5 are combined together with their male and female threads 8 and 9, they fit in their preselected positions.

An ordinary synthetic rubber O-ring with its inner diameter equal to or slightly smaller than the bottom diameter of the groove 2 is used as the packing 3, the O-ring 3 being expanded to fit into the groove 2. An O-ring of 1.5mm wire thickness is preferable for 4mm to 22mm outside diameter pipes and a 2.0mm wire thickness O-ring is desirable for more than 22mm outside diameter pipes.

The sleeve 6 has its inner diameter slightly larger than the outer diameter of the pipe 1, and its rear end face 10 has a given circular width which is adapted to press the O-ring 3 by a predetermined area when the fastener 7 is fastened. The sleeve 6 also has the outer surfaces 11 of its rear portion tapered in order to contact, in a face-to-face relationship, the tapered inner surface 4 of the body 5.

It is preferred that the sleeve 6 has a flange 12 formed at a proper position on its tapered outer surface 11 which limits excessive introduction of the sleeve 6 into the zone between the body 5 and the pipe 1 and prevents the pipe 1 from damage due to abnormal construction when the fastener 7 is tightened.

Advantageously, the sleeve 6 has on its front portion a tapered outer surface 13 adapted to contact in a face-to-face relationship the tapered inner surface 14 of the fastener 7 and a formed circular projection 15, so that when the fastener 7 is tightly threaded, a binding projection 16 is formed on the inside of the sleeve 6 due to plastic deformation to constrict the pipe 1, thereby accomplishing a tight coupling.

The joint assembly of the present invention is assembled by the steps of first setting fastener 7 and sleeve 6 on pipe 1. Secondly, the O-ring 3 is fitted into groove 2 to place sleeve 6 into position, and finally, the body 5 is threaded into fastener 7.

The inner diameter of sleeve 6 must be slightly larger than the outer diameter of pipe 1 to account for the outer diameter tolerance. Accordingly, in the case where the smallest pipe is used, because of the tolerance there remains a relatively wide clearance between the inside of sleeve 6 and outside of pipe 1. Irrespective of this clearance, when fastener 7 is fastened, the rear end portion of sleeve 6 is reduced so that it conforms with the tapered inner surface 4 of body 5 so that the sleeve 6 fits closely to the outer surface of pipe 1 and presses the O-ring 3 together with the pipe end toward the rearward position of the tapered inner surface 4 of body 5. The O-ring 3 is deformed so as to produce a complete sealing effect. The O-ring 3 also serves as a stopper for positioning sleeve 6, so that the pipe joint can be easily assembled.

The pipe joint assembly of the present invention has many other advantages as follows:

1. Irrespective of the outer diameter tolerance of pipe 1, the joint assembly of the present invention assures that the sealing effect is stable, since sleeve end face 10 always causes a preselected deformation of O-ring 3 because of its given circular width.

2. Due to the fact that there is no clearance on the pressed side of the O-ring 3, as best seen in FIG. 4, O-ring 3 is completely prevented from being forced out of the groove 2. In the conventional joint, the O-ring is inevitably forced out due to the presence of such clearance.

3. In general, synthetic rubber possesses the defect that, when subjected to a volume-compression, it permanently deforms. The O-ring 3 of circular cross-section is put in a circular space of triangular cross-section in the joint, in which the O-ring is compressed limitedly with a given circular width of the O-ring as described in paragraph 1 above, and thereby deformed free of volume-compression. This assures a long life sealing effect.

4. When a 1.5mm wire thickness O-ring is used, even small diameter pipes such as small automobile brake oil pipes of 4.76mm outer diameter and 0.6mm thickness can withstand high pressures above the rupture pressure of 1450 atmospheres of the pipe due to the shearing stress of the O-ring. The joint has an actual safety strength higher than the above value because the sleeve end portion is reduced to clamp the pipe.

5. In a case where the pipe which is used has a bad finishing surface, for example, a seamline, and/or knock-marks, groove 2 always has a mirror-like rolled surface, thereby causing no damage to the sealing effect.

6. Since sleeve 6 is contractile, the inventive joint assembly is available for pipes with a relatively large outer diameter tolerance.

7. There is no problem in positioning the sleeve for assembling the pipe joint of the present invention. Most conventional sleeve-type joints require a sleeve pre-setting operation.

8. The pipe joint assembly of the present invention can be used for extremely thin-walled pipes. The conventional sleeve-type joint is not used for thin-walled pipes because of the insufficiency in the pipe's rigidity. When thin-walled pipes are coupled with the flare-type joint, the pipe must be double-flared or the pipe end is opened in the form of a trumpet and then folded inwardly to obtain a good sealing effect. Such procedure, of course, requires many man hours.

9. The pipe joint assembly according to the present invention has a long and high sealing effect since the sleeve bears the vibration and bending stress acting on the pipe, the sealing portion being free of bending stress.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A pipe joint assembly comprising, in combination, a pipe to be coupled having at a predetermined outer position spaced from its end a rolled circular groove, of a preselected depth, said pipe having an irregular finishing surface and said groove having a semicircular cross-section, with a mirror-like rolled surface substantially free of irregularities in its finished surface, a sleeve and a fastener mounted on said pipe, a seamless circular packing disposed in said groove, said packing having a circular cross-section, said sleeve having a rear end face of a given circular width which is adapted to make face-to-face contact with said packing, a body having a tapered inner surface, the diameter of which decreases in the rearward direction, said body receiving the end portion of the pipe, the forward or entrance diameter of said tapered inner surface being slightly larger than the outer diameter of said sleeve, said body and said fastener provided with means for connecting with each other, whereby, when said fastener is fastened on said body, said sleeve is reduced by the tapered inner surface of said body to securely contact said pipe and the rear end face of the sleeve simultaneously presses against said packing toward the interior part of the tapered inner surface so that said packing is deformed to a certain extent irrespective of the outer diameter tolerance of the pipe to make a tight contact with said groove, to make a tight contact with the tapered inner surface and to make a tight contact with the sleeve rear end face, respectively.

2. The pipe joint assembly according to claim 1, wherein the sleeve contains a tapered rearward outer surface which is adapted to engage the tapered inner surface of said body.

3. The pipe joint assembly according to claim 2, wherein the sleeve contains a tapered forward outer surface and said fastener contains an inner conical surface adapted to engage the tapered forward outer surface of the sleeve.

4. The pipe joint assembly according to claim 3, wherein the sleeve has formed on its tapered forward outer surface a circular projection, said projection being arranged to abut the inner conical surface of the fastener when said fastener is fastened, so that said projection is caused to plastically deform into a binding projection on the inner surface of said sleeve.

5. The pipe joint assembly according to claim 2, wherein said sleeve has a flange formed at a given position on its outer surface to limit the endwise insertion of said sleeve into the inside of said body to a predetermined extent.

6. The pipe joint assembly according to claim 1, wherein the irregular finishing surface is at least one seamline.

* * * * *